US010296174B2

(12) United States Patent
Steinberg et al.

(10) Patent No.: US 10,296,174 B2
(45) Date of Patent: May 21, 2019

(54) CODING FOR TRACKS

(71) Applicant: Raytheon Company, Waltham, MA (US)

(72) Inventors: Richard Steinberg, Huntsville, AL (US); Daniel T. Donohoo, Athens, AL (US)

(73) Assignee: RAYTHEON COMPANY, Waltham, MA (US)

( * ) Notice: Subject to any disclaimer, the term of this patent is extended or adjusted under 35 U.S.C. 154(b) by 49 days.

(21) Appl. No.: 15/649,997

(22) Filed: Jul. 14, 2017

(65) Prior Publication Data

US 2019/0018553 A1     Jan. 17, 2019

(51) Int. Cl.
| | |
|---|---|
| *G06F 3/0482* | (2013.01) |
| *G08G 5/00* | (2006.01) |
| G08G 5/06 | (2006.01) |
| G01S 13/93 | (2006.01) |

(52) U.S. Cl.
CPC ......... *G06F 3/0482* (2013.01); *G08G 5/0013* (2013.01); *G01S 13/9303* (2013.01); *G08G 5/0004* (2013.01); *G08G 5/0026* (2013.01); *G08G 5/065* (2013.01)

(58) Field of Classification Search
CPC .. G06F 3/0482; G08G 5/0013; G08G 5/0004; G08G 5/0026; G08G 5/065; G01S 13/9303
See application file for complete search history.

(56) References Cited

U.S. PATENT DOCUMENTS

| | | | |
|---|---|---|---|
| 7,738,679 B2 | 6/2010 | Blais | |
| 8,160,755 B2 * | 4/2012 | Nichols | ................. G06T 11/206 340/435 |
| 8,244,775 B1 | 8/2012 | Bak et al. | |
| 8,311,737 B2 | 11/2012 | Poppen et al. | |
| 8,565,958 B1 | 10/2013 | Montemerlo et al. | |
| 2014/0033107 A1 * | 1/2014 | Le Roux | ................. G01C 23/00 715/771 |

FOREIGN PATENT DOCUMENTS

WO    WO 2009/098154 A1    8/2009

OTHER PUBLICATIONS

Li, Abner. "Google Maps for Android changes direction arrow to beam, adds easy compass calibration". 9to5Google. See attached PDF version.*

\* cited by examiner

*Primary Examiner* — Nadeem Odeh
*Assistant Examiner* — Michael V Kerrigan
(74) *Attorney, Agent, or Firm* — Daly, Crowley, Mofford & Durkee, LLP

(57) ABSTRACT

A method, apparatus and computer software for coding for tracks in a system is presented. At least one track of an object is determined on a detection display map, the track having an icon associated therewith. The icon is supplemented with a shape indicating additional information relating to attributes of the track, the shape providing perceptual visual awareness for an operator of said system. The shape includes an indicator of at least one of direction, velocity, path uncertainty, and a level of urgency of the track of the object.

17 Claims, 6 Drawing Sheets

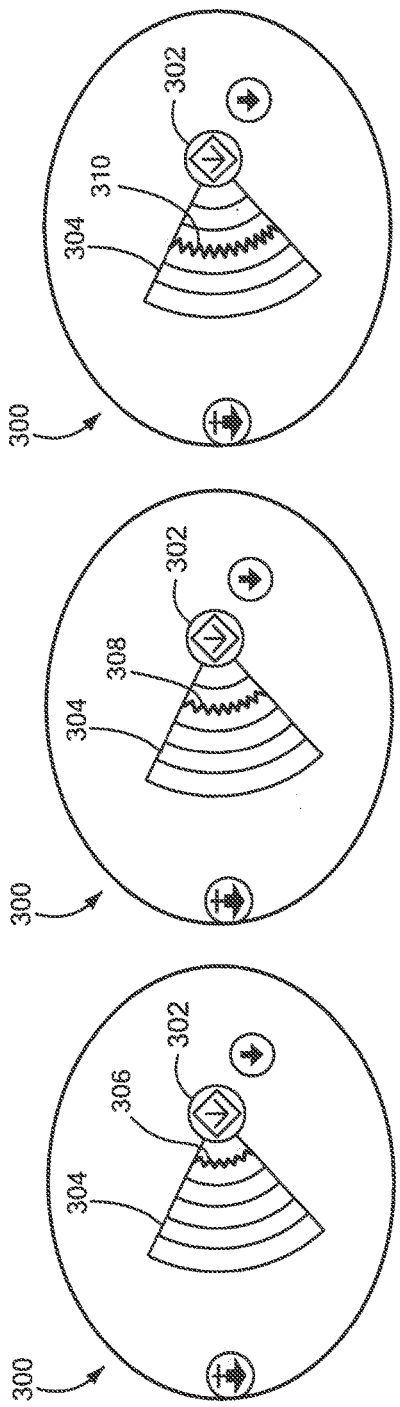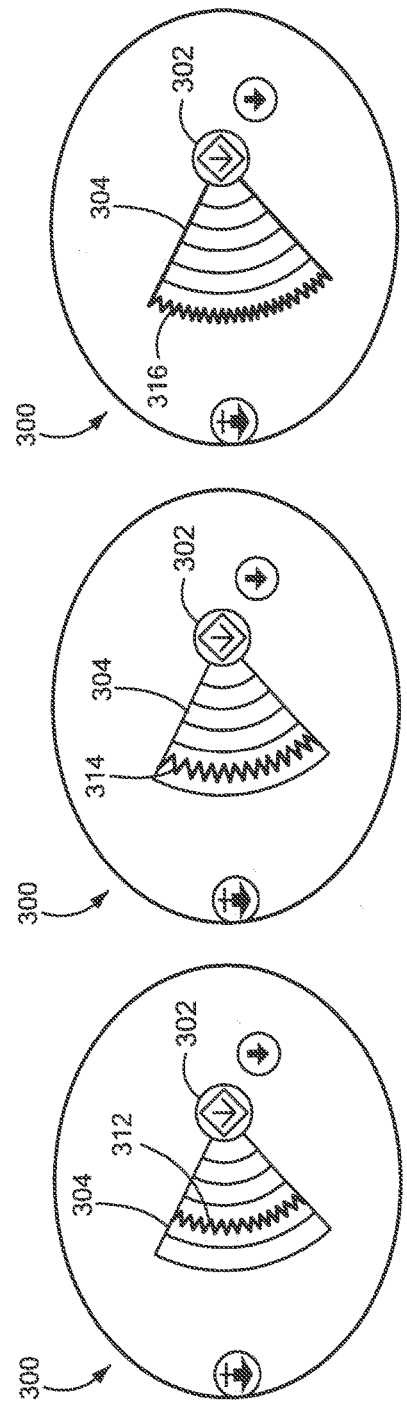

CODING FOR TRACKS

BACKGROUND

As is known in the art, map displays, such as those used for air traffic control or a detection system for tracking tracks, can quickly become overloaded with information that makes it difficult to ascertain certain conditions. In order to alleviate the problem of visually overloaded map displays, designers have used highlighting, filtering, shape and color coding, and track amplification popups. The limitation with highlighting is that it is typically done to focus categories of tracks rather than identifying the most important tracks within a category. This may not eliminate the problem with operator judgement errors when discerning priorities within a category of tracks for example. When there are large numbers of tracks highlighted, operators tend to ignore the highlighting. Filtering, or removing information from the display makes it easier to sift through the remaining information, but it reduces cognizance of the information removed from the display. This may become an issue as the environment evolves during a mission where situation awareness is required for timely operator responses. In addition, track amplification popups add additional information which can result in clutter and requires cognitive effort to understand the alpha-numeric information.

One type of known detection system comprises a shark detection system which uses observers to warn swimmers and surfers of potential sharks that may be approaching the area where the swimming or surfing is occurring. In such a manner, the swimmer or surfer can be made aware of sharks that might not otherwise be observable.

Military installations use radar systems and displays to track potential objects approaching assets that are desired to be kept safe. The assets may be on land (e.g., a military installation) or in water (a ship or an oil rig) or in the air (e.g., a jet aircraft), and can be mobile (e.g., a ship) or stationary (e.g., an oilrig).

One method of controlling airport traffic involves the use of air traffic controllers. Air traffic controllers are responsible for the separation and efficient movement of aircraft and vehicles operating on the taxiways and runways of the airport itself, and aircraft in the air near the airport. Surveillance displays are available to controllers to assist with controlling air traffic. Controllers may use a radar system for airborne traffic approaching and departing. These displays include a map of the area, the position of various aircraft, and data tags that include aircraft identification, speed, altitude, and other information.

Referring to FIG. 1, a prior art tracking system display 100 is shown. As can be seen from the figure, the tracking system display is showing a large amount of information. In some scenarios, the amount of information displayed inundates the operator and makes it difficult to determine which objects represent tracks and are prioritized. In a particular embodiment, the display of tracks needs to be prioritized to attract the attention of the operator. In the prior art example shown in FIG. 1, there is little or nothing to make one symbol more prominent than another, and concomitantly to attract the attention of an operator. Accordingly, certain tracks could be overlooked.

Existing track monitoring displays are data intensive and situation maps have a tendency to become overloaded with visual clutter. Identifying critical information in the display can be difficult and labor intensive. Operators have a limited visual capacity and without effective methods to focus an operator's attention, similar symbols appear to have the same sense of urgency. Operators can easily miss information in another part of the map display while focused on an item. Operators are required to draw conclusions using location, rate of movement and direction of symbols to determine the most dangerous tracks.

SUMMARY

In one particular embodiment, a method of coding for tracks in a system includes determining at least one track of an object on a detection display map, the track having an icon associated therewith. The method may further include supplementing the icon with a shape indicating additional information relating to attributes of the track, the shape providing perceptual visual awareness for an operator of the system. The method may further include wherein the shape indicating additional information includes an indicator of at least one of a level of urgency associated with the object, a direction of the object, a velocity of the object, and/or maneuverability of the track of the object.

In another embodiment, a detection system for coding of tracks includes a processor and a memory storing computer program code that when executed on the processor causes the processor to operate the detection system, the detection system operable to perform the operations of determining at least one track of an object on a detection display map, the track having an icon associated therewith. The processor may further supplement the icon with a shape indicating additional information relating to attributes of the track, the shape providing perceptual visual awareness for an operator of the system. The shape may indicate of at least one of a level of urgency associated with the object, a direction of the object, a velocity of the object, and maneuverability of the w track of the object.

In another embodiment, a computer program product including a non-transitory computer readable storage medium having computer program code encoded thereon that when executed on a processor of a computer causes the computer to operate a detection system, the computer program product comprises computer program code for determining at least one track of an object on a detection display map, the track having an icon associated therewith. The computer program product may further include computer program code for supplementing the icon with a shape indicating additional information relating to attributes of the track, the shape providing perceptual visual awareness for an operator of the system. The computer program product may additionally include computer program code for supplementing the icon with a shape indicating of at least one of a level of urgency associated with the object, a direction of the object, a velocity of the object, and maneuverability of the track of the object.

BRIEF DESCRIPTION OF THE DRAWINGS

The foregoing features may be more fully understood from the following description of the drawings in which:

FIGS. 3A-3F are diagrams showing an icon and shape indicating movement of an object in accordance with illustrative embodiments;

The drawings are not necessarily to scale, or inclusive of all elements of a system, emphasis instead generally being placed upon illustrating the concepts, structures, and techniques sought to be protected herein.

DETAILED DESCRIPTION

Embodiments of the presently described method and apparatus for coding tracks relate to incorporating a track prioritization technique where the most urgent or highest priority tracks are rank ordered. Example systems that use this technique can include air traffic control systems, military installations and shark protection for swimmers and or surfers. In some instances, the track may be considered a hostile or threatening track of an object.

Example embodiments of the presently described method, apparatus and software relate to defense systems for naval vessels and particularly to systems of such type which use projectiles to intercept and to destroy hostile aircraft, for example, and, in addition, so may be used to detect and to track surface targets, such as other naval vessels and navigational aids. The display system includes improved notification to allow a user to more quickly and easily understand a situation. The presentation of data described herein may provide cognitive and ergonomic efficiencies and advantages over previous systems.

To increase contrast for users, embodiments use jagged shapes, motion, and/or high tonality colors. In some embodiments, the brighter the color tone, the higher the priority of the track. Jagged shapes in the form of a fan may draw the operator's eye to tracks considered hostile. Relative motion of high tone colors of range arcs in the fan may steer the operator's eye to the path of the track. In embodiments, the radius of the fan corresponds to the velocity of the moving track. The angular width corresponds to the relative certainty of the predicted path of the track.

Using the prioritization rank, for example, the top tracks are displayed with a contrasting shape (e.g., a jagged saw tooth fan) emanating from the icon in the direction of its velocity vector. The size of the shape provides an indication regarding the magnitude of the velocity and uncertainty of the predicted path. Motion of arcs within the shape may show direction and range arcs representing potential location of the track in the future may denote velocity and direction uncertainty. A shape may update every second, for example, adding motion to the display and giving the operator additional cues with respect to the urgency of responding to the track.

Figure 1:
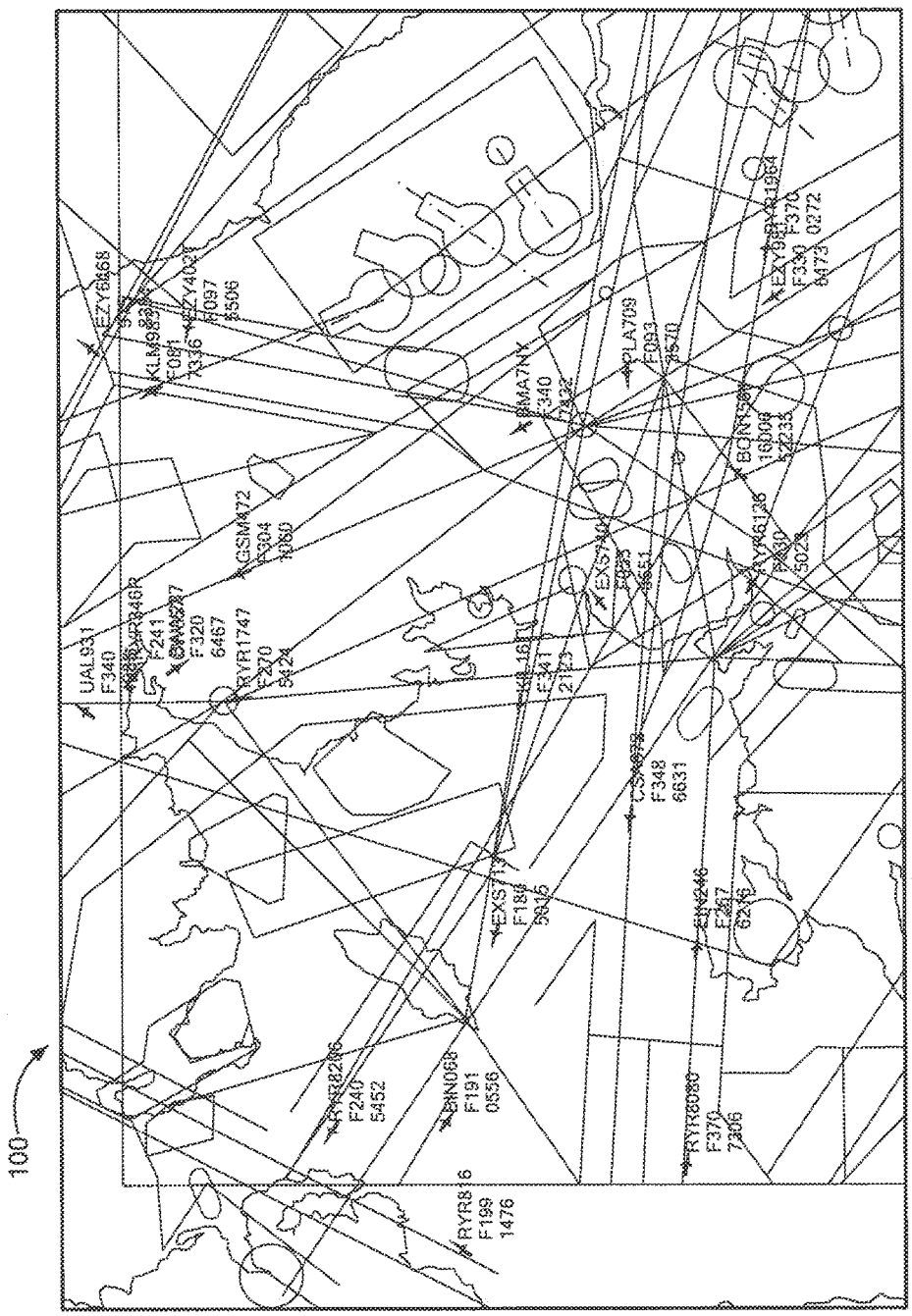
FIG. 1 is a screen shot of a prior art tracking system showing a plurality of icons.
Figure 2:
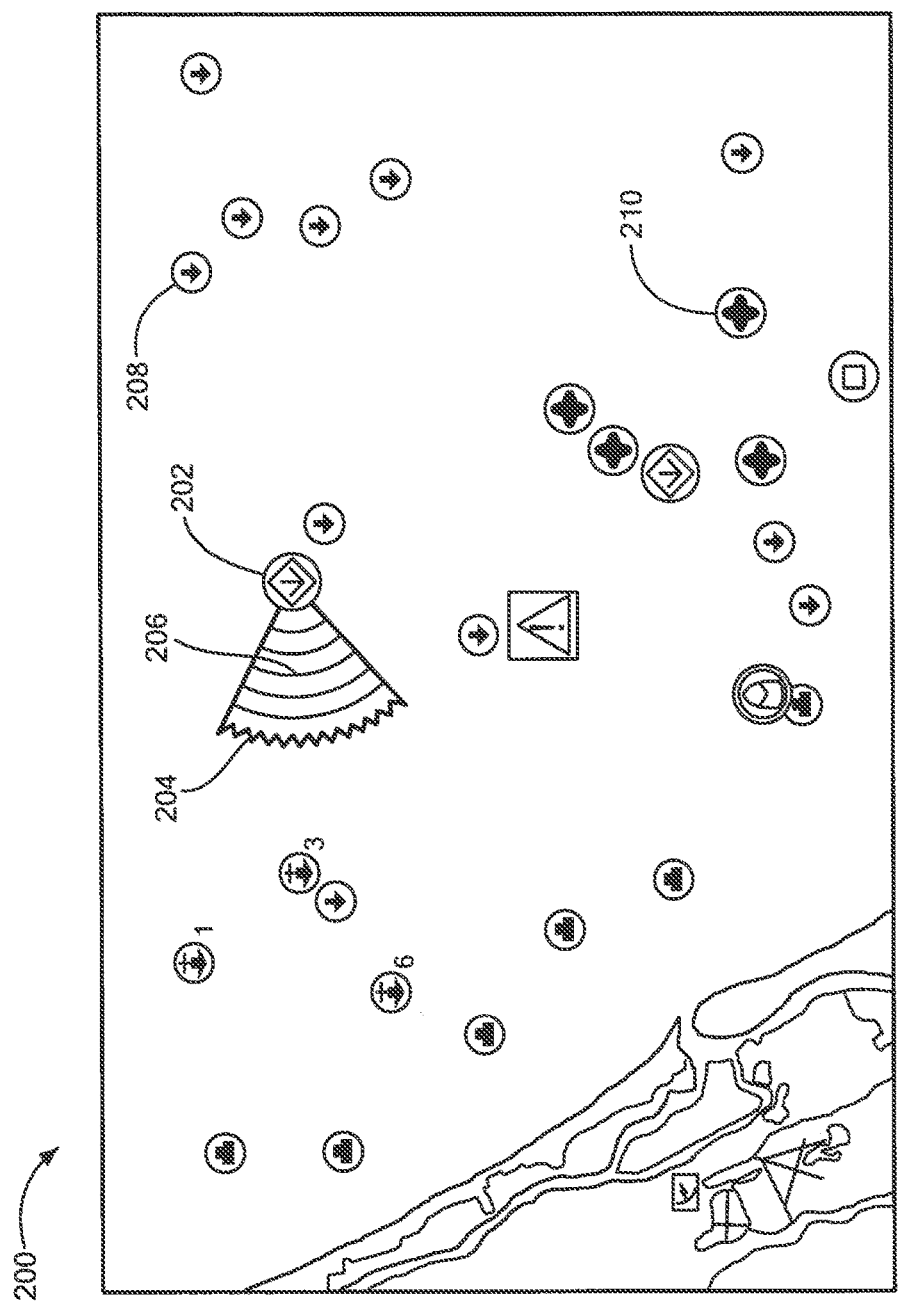
FIG. 2 is a screen shot of a detection system showing an icon indicating a track and a shape providing perceptual visual awareness.

FIG. 2 shows a screen shot 200 of an example detection system showing an icon 202 indicating a potential track. It is understood that radar and other systems to detect, characterize, and track targets are well known in the art. In embodiments, icon 202 may be colored to indicate a track (e.g., colored red). Icon 202 has been supplemented with a shape 204 indicating additional metadata related to the track. The shape 204 provides perceptual visual awareness to a viewer of the display, thereby alerting the viewer to the track. In one embodiment, the shape 204 takes the form of a fan having a saw tooth style leading edge although other shapes could also be used. Multiple range arcs 206 are shown within the fan shape 204, which can indicate multiple pieces of metadata. In one embodiment, the radius of the fan 204 can indicate velocity, where a larger fan radius indicates a faster object speed while a smaller radius indicates a slower moving object. In one embodiment, the fan 204 can also indicate the direction the object is heading. In one embodiment, the width of the fan 204 can also indicate an area of path uncertainty where a narrow fan width indicates the object is not very maneuverable, while a wider fan width indicates a greater degree of path uncertainty. In one embodiment, the range arcs 206 within a fan 204 can indicate speed, described in detail below with respect to FIGS. 3A-F.

The detection system display 200 may also show additional information. Icon 208 has a different color (e.g., blue) than icon 202 (e.g., red) and therefore icon 208 represents a different asset. Icon 210 indicates objects that are known, such as those associated with commercial aircraft, and as such may have a different color (e.g., yellow) than icon 202 and icon 208.

FIGS. 3A-3F show a particular icon 302 and fan 304. Each fan also includes a plurality of concentric range arcs, one of which is highlighted in each of FIGS. 3A-3F. At a first point in time, as shown in FIG. 3A, a first range arc 306 is highlighted. At a second point in time (for example one second after the first point in time), a second range arc 308 is highlighted and the first range arc is no longer highlighted. At a third point in time (for example one second after the second point in time), a third range arc 310 is highlighted and the second range arc is no longer highlighted. At a fourth point in time (for example one second after the third point in time), a fourth range arc 312 is highlighted and the third range arc is no longer highlighted. At a fifth point in time (for example one second after the fourth point in time), a fifth range arc 314 is highlighted and the fourth range arc is no longer highlighted. At a sixth point in time (for example one second after the fifth point in time), a sixth range arc 316 is highlighted and the fifth range arc is no longer highlighted. When viewing the icon and associated fan over a period of time, the serial highlighting of each range arc gives the appearance of movement, which attracts a viewer's eye. The distance between the range arcs of a fan may correspond to a velocity of the object indicated by icon 302 and thus provide an indication of movement, and also of the speed and direction of the object. This cycle may repeat periodically.

Figure 4:
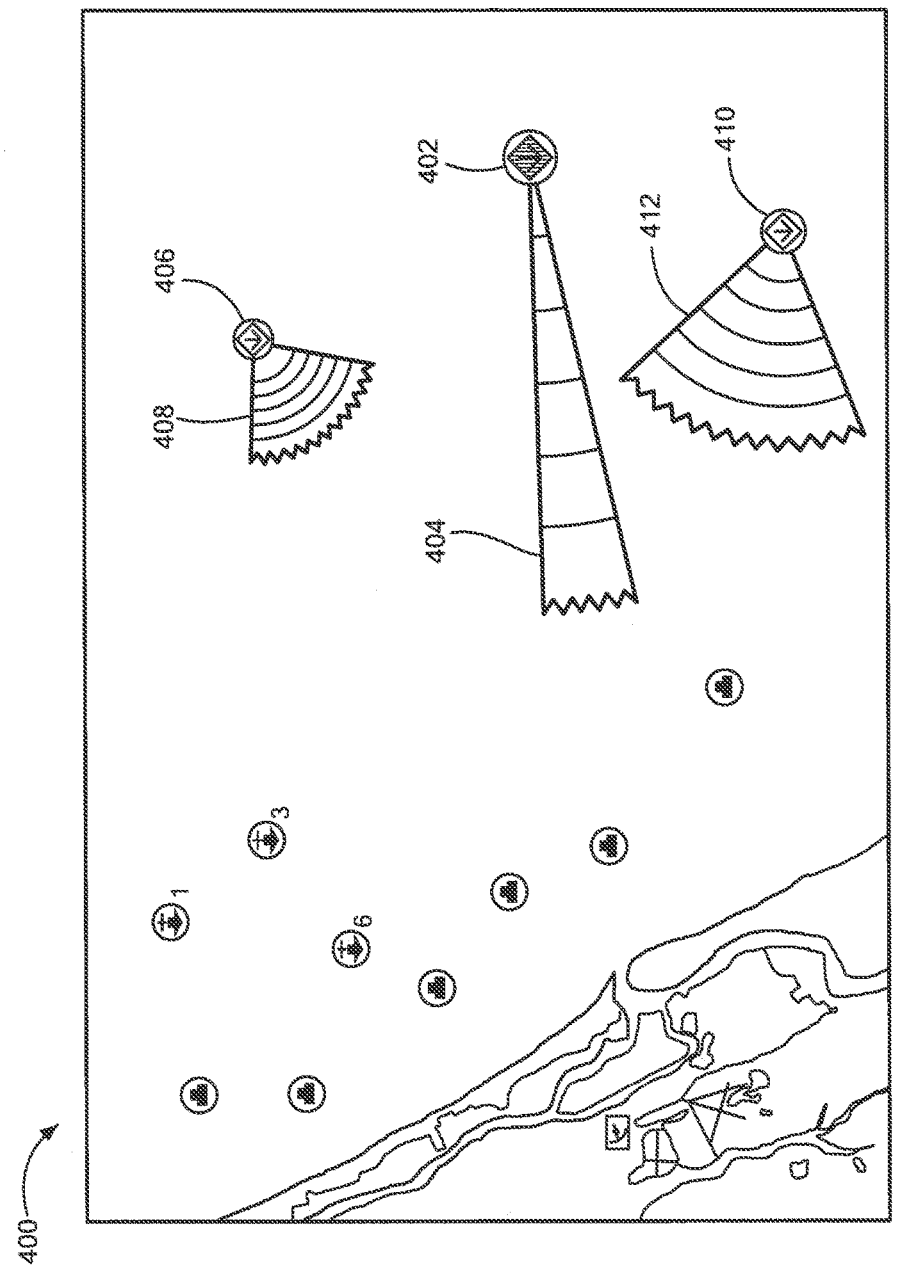
FIG. 4 is screen shot of a detection system showing a group of icons indicating different tracks and having shapes providing perceptual visual awareness in accordance with illustrative embodiments.

Referring now to FIG. 4, an example showing three identified tracks 402, 406 and 410 depicted. The icon 406 is shown in a color that is less perceptible than the icons 402 or 410. Icon 406 would still standout from other icons but is not categorized as having higher priority than the objects for icons 402 or 410. For example, icons such as those associated with commercial aircraft may have a yellow shape while icons representing other tracks may have a brighter color such as red. Further, the shade of red may indicate a prioritization over other red icons, with the brighter the shade of red, the more significant the track. In an example, assume icon 402 has a brighter shade of red than icons 410 which has a brighter shade of red than icon 406, but less than icon 402. Accordingly, even though the icons may have the same shape, the different brightness of the color of icon 402 as compared to icons 406 and 410 makes icon 402 stand out and denotes prioritization.

The icons 402, 406, 410 are supplemented with a shape to indicate additional information relating to attributes of the track. In one embodiment, the shape takes the form of a fan having a saw tooth shaped leading edge, although it should be understood that other shapes could also be used. As shown, icon 402 has been supplemented with shape 404, icon 406 has been supplemented with shape 408 and icon 410 has been supplemented with shape 412. In this particular example the shapes are fans, although it should be appreciated that other shapes could also be used. In embodiments, the fans convey information. The fans can indicate velocity. The fans can also indicate the direction the track is heading. The fans can also indicate an area of uncertainty or maneuverability of the predicted object path.

The most urgent track has the largest relative brightness for the associated fan. Thus, the track identified by icon 402 and fan 404 has a higher urgency than either the track 406 and associated fan 408 or the track 410 and fan 412. In an embodiment, each range arc within a fan shows an expected distance the object will travel for a given period of time. For example, here object 402 is moving faster than object 410 since the distance between the range arcs for fan 404 is larger than the distance between range arcs for fan 412. Similarly, object 410 is moving faster than object 406 since the distance between the range arcs for fan 412 is larger than the distance between range arcs for fan 408.

A size of the angle of the fan shows the potential path uncertainty of the object. As shown in FIG. 4, object 402 is less maneuverable than object 406 or object 410 since the size of the angle of fan 404 is narrower than the size of the angle for fan 408 and the size of the angle for fan 412. The path of the object associated with icon 410 is more uncertain than the path of the object associated with icon 402.

Figure 5:
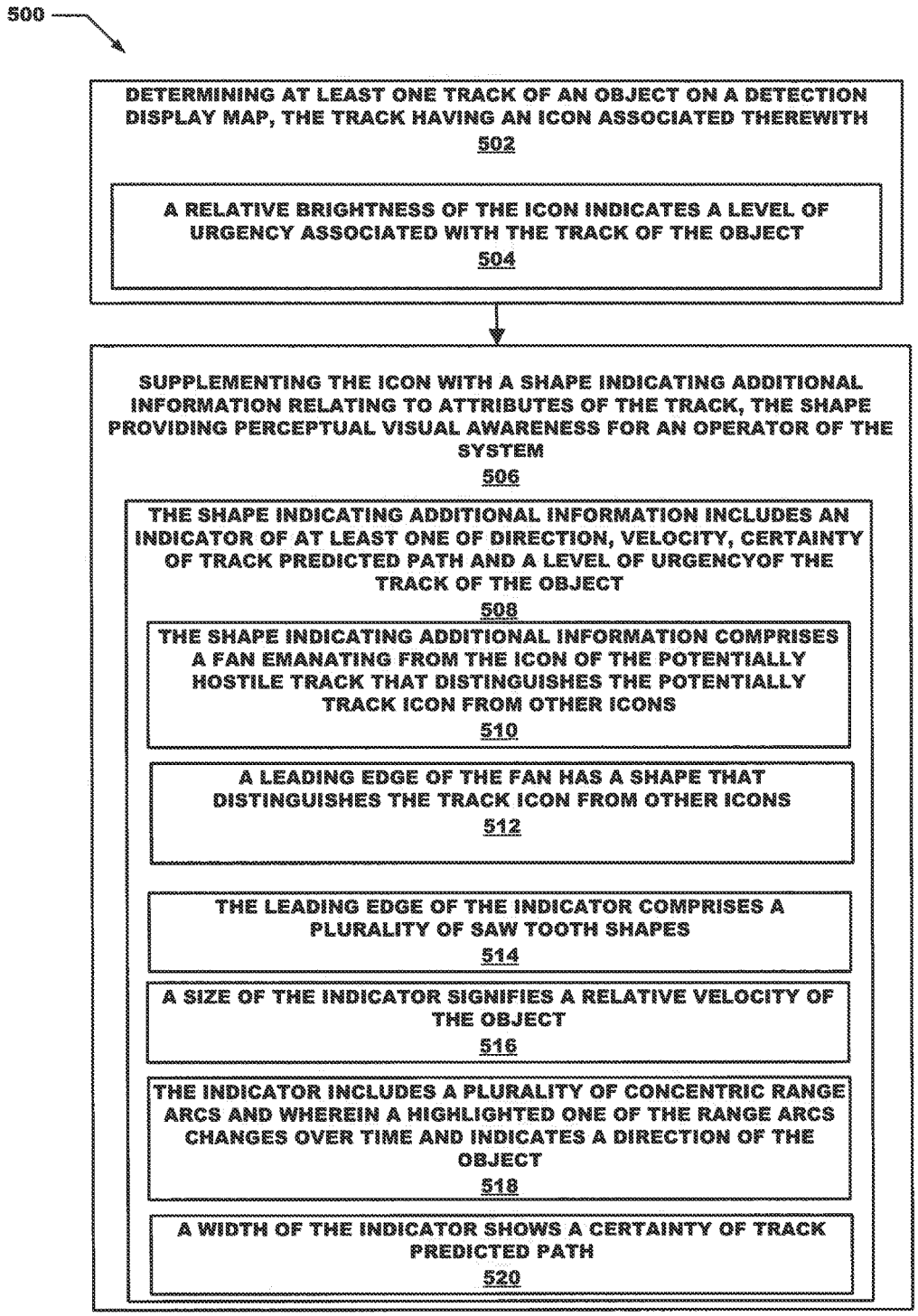
FIG. 5 is a flow diagram of a particular embodiment of a method for coding tracks in accordance with illustrative embodiments.

Referring to FIG. 5, an example process flow diagram of one embodiment 500 of a method of coding for tracks is shown. Rectangular elements (typified by element 502 in FIG. 5), are herein denoted "processing blocks," represent computer software instructions or groups of instructions. Alternatively, the processing blocks may represent steps performed by functionally equivalent circuits such as a digital signal processor (DSP) circuit or an application specific integrated circuit (ASIC). The flow diagrams do not depict the syntax of any particular programming language but rather illustrate the functional information one of ordinary skill in the art requires to fabricate circuits or to generate computer software to perform the processing required of the particular apparatus. It should be noted that many routine program elements, such as initialization of loops and variables and the use of temporary variables may be omitted for clarity. The particular sequence of blocks described is illustrative only and can be varied without departing from the spirit of the concepts, structures, and techniques sought to be protected herein. Thus, unless otherwise stated, the blocks described below are unordered meaning that, when possible, the functions represented by the blocks can be performed in any convenient or desirable order.

The method 500 begins with processing block 502 which discloses determining at least one track of an object on a detection display map, the track having an icon associated therewith. As shown in processing block 504, in some embodiments a relative brightness of the icon indicates a level of urgency associated with the track of the object. For example, in FIG. 4, assume icon 402 and fan 404 are more urgent than icon 406 and fan 408 as well as icon 410 and fan 412 since icon 402 and fan 404 are brighter and therefore more easily observable by an operator and provide a visual indication with respect to prioritization to the operator.

Processing block 506 shows supplementing the icon with a shape indicating additional information relating to attributes of the track, the shape providing perceptual visual awareness for an operator of the system. Processing block 508 discloses that the shape indicating additional information includes an indicator of at least one of direction, velocity, and ambiguity of the track of the object.

Processing block 510 shows the shape indicating additional information comprising a fan emanating from the icon of the track that distinguishes the track icon from other icons. Processing block 512 shows a leading edge of the fan has a shape that distinguishes the track icon from other icons. As shown in processing block 514, the leading edge of the fan comprises a plurality of saw tooth shapes. The saw tooth shape has been selected in this embodiment as this particular shape provides a high level of perceptual visual awareness to an operator.

Processing block 516 discloses that a size of the indicator signifies a relative velocity of the object. Processing block 518 shows that the indicator includes a plurality of concentric range arcs and that a highlighted one of the range arcs changes over time and indicates a direction of the object. The arcs are used to indicate direction and speed.

Processing block 520 shows that a width of the indictor shows a maneuverability of the object. An indicator having a relatively narrow width has less maneuverability (for example a missile) whereas an indicator having a larger width has more maneuverability (for example a jet).

Figure 6:
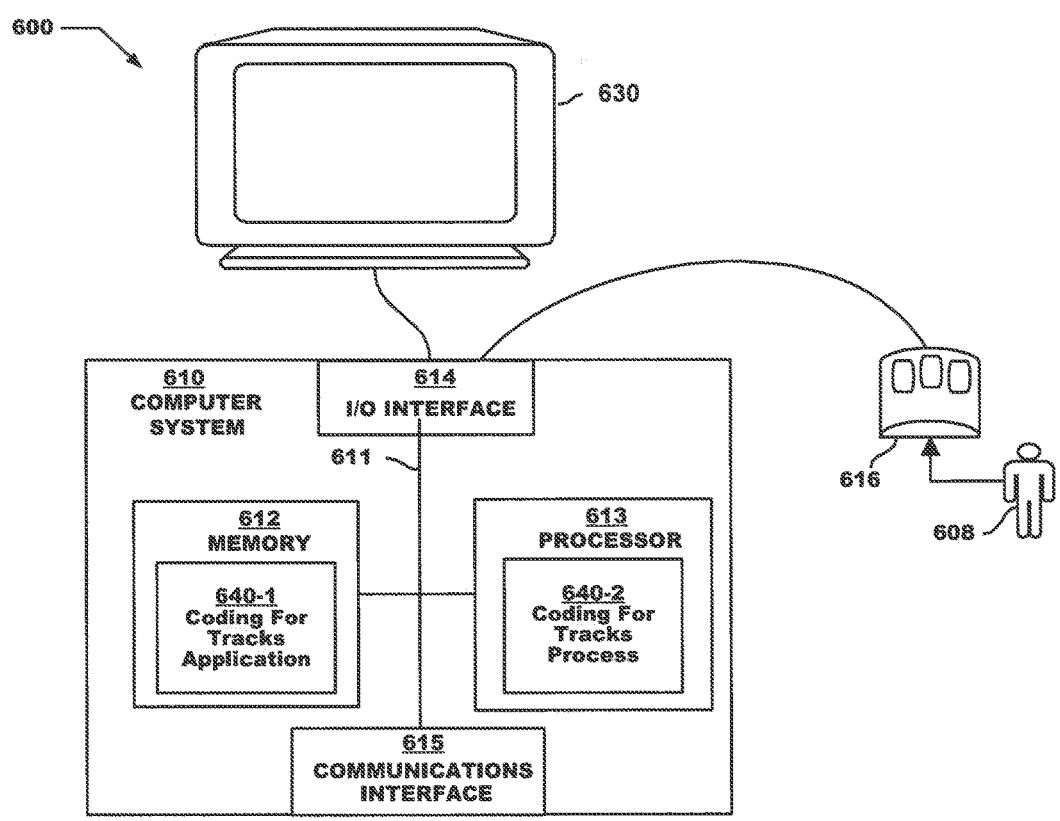
FIG. 6 is a block diagram of a computer system for coding tracks in accordance with illustrative embodiments.

FIG. 6 is a block diagram illustrating example architecture of a computer system 610 that executes, runs, interprets, operates or otherwise performs at least a portion of the processing described herein for coding for tracks operating application 640-1 and coding for tracks operating process 640-2 suitable for use in explaining example configurations disclosed herein. The computer system 610 may be any type of computerized device such as a personal computer, workstation, portable computing device, console, laptop, network terminal or the like. An input device 616 (e.g., one or more customer/developer controlled devices such as a keyboard, mouse, etc.) couples to processor 613 through I/O interface 614, and enables a customer 608 to provide input commands, and generally control the graphical user interface that the coding for tracks operating application 640-1 and process 640-2 provides on the display 630.

As shown in this example, the computer system 610 includes an interconnection mechanism 611 such as a data bus or other circuitry that couples a memory system 612, a processor 613, an input/output interface 614, and a communications interface 615. The communications interface 615 enables the computer system 610 to communicate with other devices (i.e., other computers) on a network (not shown).

The memory system 612 is any type of computer readable medium, and in this example, is encoded with a coding for tracks operating application 640-1 as explained herein. The coding for tracks operating application 640-1 may be embodied as software code such as data and/or logic instructions (e.g., code stored in the memory or on another computer readable medium such as a removable disk) that supports processing functionality according to different embodiments described herein. During operation of the computer system 610, the processor 613 accesses the memory system 612 via the interconnect 611 to launch, run, execute, interpret or otherwise perform the logic instructions of a coding for tracks operating application 640-1. Execution of a coding for tracks operating application 640-1 in this manner produces processing functionality in the coding for tracks operating process 640-2. In other words, the coding for tracks operating process 640-2 represents one or more portions or runtime instances of a coding for tracks operating application 640-1 (or the entire a coding for tracks operating application 640-1) performing or executing within or upon the processor 613 in the computerized device 610 at runtime.

It is noted that example configurations disclosed herein include the coding for tracks operating application 640-1 itself (i.e., in the form of un-executed or non-performing logic instructions and/or data). The coding for tracks operating application 640-1 may be stored on a computer readable medium (such as a digital video disk), hard disk, electronic, magnetic, optical, or another computer readable medium. A coding for tracks operating application 640-1 may also be stored in a memory system 612 such as in firmware, read only memory (ROM), or, as in this example, as executable code in, for example, Random Access Memory (RAM). In addition to these embodiments, it should also be noted that other embodiments herein include the execution of a coding for tracks operating application 640-1 in the processor 613 as the coding for tracks operating process 640-2. Those skilled in the art will understand that the computer system 610 may include other processes and/or software and hardware components, such as an operating system not shown in this example.

A display 630 need not be coupled directly to computer system 610. For example, the coding for tracks operating application 640-1 can be executed on a remotely accessible computerized device via the network interface 615. In this instance, the graphical user interface may be displayed locally to a customer 608 of the remote computer, and execution of the processing herein may be client-server based.

During operation, processor 613 of computer system 600 accesses memory system 612 via the interconnect 611 in order to launch, run, execute, interpret or otherwise perform the logic instructions of the coding for tracks application 640-1. Execution of coding for tracks application 640-1 produces processing functionality in coding for tracks process 640-2. In other words, the coding for tracks process 640-2 represents one or more portions of the coding for tracks application 640-1 (or the entire application) performing within or upon the processor 613 in the computer system 600.

It should be noted that, in addition to the coding for tracks process 640-2, embodiments herein include the coding for tracks application 640-1 itself (i.e., the un-executed or non-performing logic instructions and/or data). The coding for tracks application 640-1 can be stored on a computer readable medium. The coding for tracks application 640-1 can also be stored in a memory type system such as in firmware, read only memory (ROM), or, as in this example, as executable code within the memory system 612 (e.g., within Random Access Memory or RAM).

In addition to these embodiments, it should also be noted that other embodiments herein include the execution of coding for tracks application 640-1 in processor 613 as the coding for tracks process 640-2. Those skilled in the art will understand that the computer system 600 can include other processes and/or software and hardware components, such as an operating system that controls allocation and use of hardware resources associated with the computer system 600.

Having described certain embodiments, which serve to illustrate various concepts, structures, and techniques sought to be protected herein, it will be apparent to those of ordinary skill in the art that other embodiments incorporating these concepts, structures, and techniques may be used. Elements of different embodiments described herein above may be combined to form other embodiments not specifically set forth above and, further, elements described in the context of a single embodiment may be provided separately or in any suitable sub-combination. Accordingly, it is submitted that the scope of protection sought herein should not be limited to the described embodiments but rather should be limited only by the spirit and scope of the following claims.

What is claimed is:

1. A method of coding for tracks in a system, the method comprising: determining moving data for at least one track of a vehicle on a detection display map, the track having an icon associated therewith; supplementing the icon with a shape indicating additional information relating to attributes of the track, the shape including a fan having a plurality of arcs formed therein, any two of the arcs being spaced apart from one another by a distance that is based on at least one of the attributes of the track; and outputting the supplemented icon for presentation to an operator of the system, wherein the attributes include at least one of a path uncertainty or a level of urgency of the track.

2. The method of claim 1 wherein outputting the supplemented icon includes serially highlighting the plurality of arcs.

3. The method of claim 1 wherein a leading edge of the fan has a shape that distinguishes the icon from other icons.

4. The method of claim 3 wherein the leading edge comprises a plurality of saw tooth shapes.

5. The method of claim 1 wherein a size of the fan signifies a relative velocity of the vehicle.

6. The method of claim 1 wherein the distance is further based on a speed of the vehicle.

7. The method of claim 1 wherein a width of the fan shows a path uncertainty of the vehicle.

8. The method of claim 1 wherein a relative brightness of the icon indicates a level of urgency associated with the track.

9. A method for displaying tracks on a graphical user interface (GUI), the method comprising: displaying at least one track of a vehicle on the GUI, the track including moving data of the vehicle, and the track having an icon associated therewith; and displaying the icon with a shape indicating additional information relating to attributes of the track, the shape including a fan having a plurality of arcs formed therein, any two of the arcs being spaced apart from one another by a distance that is based on at least one of the attributes of the track, wherein the attributes include at least one of a path uncertainty or a level of urgency of the track.

10. The method of claim 9 wherein displaying the icon includes serially highlighting the plurality of arcs.

11. The method of claim 9 wherein the fan includes a leading edge having a shape that distinguishes the icon from other icons.

12. The method of claim 11 wherein the leading edge includes a plurality of saw tooth shapes.

13. The method of claim 9 wherein a size of the fan signifies a relative velocity of the vehicle.

14. The method of claim 9 wherein the distance is further based on a speed of the vehicle.

15. The method of claim 9 wherein a width of the fan is based on a path uncertainty of the vehicle.

16. The method of claim 9 wherein a relative brightness of the icon indicates a level of urgency associated with the track.

17. A non-transitory computer readable storage medium storing one or more processor-executable instructions, which when executed by at least one processor cause the at least one processor to perform the operations of: determining at least one track of a vehicle on a detection display map, the track including moving data of the vehicle, and the track having an icon associated therewith; and supplementing the icon with a shape indicating additional information relating to attributes of the track, the shape including a fan having a plurality of arcs formed therein, any two of the arcs being spaced apart from one another by a distance that is based on at least one of the attributes of the track, wherein the attributes include at least one of a path uncertainty or a level of urgency of the track.

* * * * *